United States Patent
Sundaresan

(12) 
(10) Patent No.: US 6,289,369 B1
(45) Date of Patent: Sep. 11, 2001

(54) AFFINITY, LOCALITY, AND LOAD BALANCING IN SCHEDULING USER PROGRAM-LEVEL THREADS FOR EXECUTION BY A COMPUTER SYSTEM

(75) Inventor: Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/140,129

(22) Filed: Aug. 25, 1998

(51) Int. Cl.$^7$ ........................................ G06F 9/00
(52) U.S. Cl. ........................ 709/103; 709/100; 709/105
(58) Field of Search ................... 709/100, 101, 709/102, 103, 104, 105, 106, 107, 108; 703/27; 710/23; 711/6, 133, 148, 153; 712/28, 1

(56) References Cited

U.S. PATENT DOCUMENTS

| | | | |
|---|---|---|---|
| 5,613,136 | * | 3/1997 | Casavant et al. ................. 712/28 |
| 5,692,193 | * | 11/1997 | Jagannathan et al. ............. 709/106 |
| 5,745,778 | * | 4/1998 | Alferi ............................ 712/1 |
| 5,826,081 | * | 10/1998 | Zolnowsky ...................... 709/103 |
| 6,075,938 | * | 6/2000 | Bugnion et al. ................. 703/27 |
| 6,105,053 | * | 8/2000 | Kimmel et al. .................. 709/105 |

OTHER PUBLICATIONS

Anderson, T.E., "Fast Threads User's Manual," Department of Computer Science and Engineering, University of Washington, Seattle, Jan. 1990, pp. 1–18.

Chandra, R. et al., "COOL: An Object–Based Language for Parallel Programming," Computer, IEEE, 1994, pp. 13–26.

Cooper, E.C. et al., "C Threads," Department of Computer Science, Carnegie Mellon University, Pittsburgh Sep. 11, 1990, pp. 1–16.

Doeppner, Jr., T.W., "The Brown C++ Threads Package: Version 0.2," Department of Computer Science, Brown University, Providence, Nov. 1, 1994, pp. 1–17.

Felten, E.W. et al., "NewThreads 2.0 User's Guide," University of Washington, Department of Computer Science and Engineering, Aug. 24, 1992, pp. 1–8.

Galles, M. et al., "Performance Optimizations, Implementation, and Verification of the SGI Challenge Multiprocessor," Sicilon Graphics Computer Systems, 2011 No. Shoreline Blvd., Mountain View, CA 94039, 1994.

Weir, R.C., "Pthreads C Interface," Kendall Square Research Corporation, Lang Note 34, Rev. 1.4, May 17, 1991, pp. 1–23.

The Institute of Electrical and Electronics Engineers, Inc., "Information technology—Poratable Operating System Interface (POSIX®)—Part 1: System Application Program Interface (API) [C Language]," International Standard ISO/IEC9945–1: 1996 (E), IEEE Std 1003.1, 1996 Edition, pp.1–743.

Anderson, Thomas E. et al., "Thread Management for Shared–Memory Multiprocessors," Technical Report, Department of Computer Science and Engineering, University of Washington, 1991, pp. 1–19.

(List continued on next page.)

*Primary Examiner*—Majid Banankhah
(74) *Attorney, Agent, or Firm*—Gates & Cooper LLP

(57) ABSTRACT

A technique for dynamically exploiting affinity, locality, and load balancing in scheduling the execution of multi-threaded user programs in a multi-processor computer system. Affinity, locality, and load balancing characteristics are specified at thread creation time and can be dynamically changed during thread execution, either by the user program itself or by any other process or entity with sufficient privileges and information. A central schedule queue and one or more per-processor local schedule queues are used to schedule the threads based on the dynamically changing affinity, locality, and load balancing characteristics.

75 Claims, 6 Drawing Sheets

OTHER PUBLICATIONS

Birrell, Andrew D., "An Introduction to Programming with Threads," Technical Report 35, Digital Systems Research Laboratory, Palo Alto, California 94301, Jan. 6, 1989, pp. 1–33.

Ghosh, Kaushik et al., "Experimentation with Configurable, Lightweight Threads on a KSR Multiprocessor," Technical Report GIT–CC–93/37, College of Computing, Georgia Institute of Technology, Atlanta, 1993.

Keppel, David, "Tools and Techniques for Building Fast Portable Threads Packages," Technical Report UWCSE 93–05–06, University of Washington, Seattle, WA 98195, 1993, pp. 1–29.

Kleiman, Steve et al., "Programming with Threads," Sun-Soft Press, Mountainview, CA, 1996, pp. 205–212.

Kumar, Vipin et al., "Introduction to Parallel Computing—Design and Analysis of Algorithms" The Benjamin/Cummings Press Company, Cambridge, MA, 1994, pp. 460–468.

Markatos, Evangelos et al., "Load Balancing vs. Locality Management in Shared–Memory Multiprocessors," Proceedings of the International Conference on Parallel Processing, Aug. 1992, pp. 258–267.

Steckermeier, Martin et al., "Using Locality Information in Userlevel Scheduling," Technical Report TR–95–14, University of Erlangen–Nürenberg, Computer Science Department, Operating Systems—IMMD IV, Martensstrasse 1, 91058 Erlangen, Germany, Dec. 1995, pp. 1–41.

Sundaresan, Neelakantan, "Modeling Control and Dynamic Data–Parallelism in Object–Oriented Languages," Doctoral Dissertation, Indiana University, Sep. 1995, pp. 20–22, 56–64, 184–190.

Tanenbaum, Andrew S., Modern Operating Systems, Prentice Hall, Engelwood Cliffs, NJ, 1992, pp. 507–522, 524.

Torrellas, Josep et al., "Evaluating the Performance of Cache–Affinity Scheduling in Shared–Memory Multiprocessors," Journal of Parallel and Distributed Computing, vol. 24, 1995, pp.139–151.

* cited by examiner

AFFINITY, LOCALITY, AND LOAD BALANCING IN SCHEDULING USER PROGRAM-LEVEL THREADS FOR EXECUTION BY A COMPUTER SYSTEM

BACKGROUND OF THE INVENTION

1. Field of the Invention

The invention relates in general to scheduling on computer systems, and more particularly, to the use of affinity, locality, and load balancing in scheduling user program-level threads for execution by a computer system.

2. Description of Related Art

Multiple processor computer systems are a well known technique for increasing the performance of computer programs. In such systems, computer programs can be executed in parallel by utilizing each processor simultaneously.

In addition, operating systems often provide facilities for multi-threaded programming to enhance parallelism. In multi-threaded programming, the execution of a computer program is divided into multiple threads, wherein a thread is a stream of instructions executed by the computer on behalf of the computer program. Typically, each thread is allocated to a different processor, so that each of these threads is then executed in parallel at their respective separate processors, although multi-threaded programming can also enhance parallelism on uni-processor computer systems as well.

Modern operating systems typically provide facilities for multi-threaded programming at two levels: kernel-level and user program-level. See, e.g., Steve Kleiman, Devang Shah, and Bart Smaalders, Programming with Threads, Sunsoft Press, Mountain View, CAlif. 1996; and Andrew Tanenbaum, Modem Operating Systems, Prentice-Hal, Englewood Cliffs, N.J., 1992. Kernel-level threads are scheduled by the operating system. In addition, a kernel-level thread runs within a process and can be referenced by other kernel-level threads.

User program-level threads run on top of kernel level threads, can be scheduled in the user program address space, and have no kernel-level data structures. Because of this, user program-level threads generally have lower context-switch time and scheduling time as compared to kernel-level threads.

One way of differentiating kernel-level and user program-level threads is that kernel-level threads depict multi-processing resources within a system, whereas user program-level threads model parallelism within a user program. Generally, the user program has no control over kernel-level threads, unless the user program comprises kernel extensions or device drivers.

With the increasing interest in user program-level multi-threaded programming, a number of user program-level thread libraries have been implemented. Typical implementations of a user program-level thread library provide facilities for creating and destroying threads, for waiting on a thread to terminate, for waiting on a thread to yield itself, and for blocking and unblocking a thread. In addition, locking facilities for accessing data shared between the threads in a safe manner without race conditions are often provided. Mechanisms for thread-specific data, thread priorities, and thread specific signal handling also may be provided.

The most significant user program-level library is the "pthreads" library proposed by the POSIX standards committee. See, e.g., Institute of Electrical and Electronic Engineers, Inc., Information Technology—Portable Operating Systems Interface (POSIX)—Part 1: System User program Interface (API)—Amendment 2: Threads Extension [C Language], IEEE, New York, N.Y., IEEE Standard 1003.1c-1995 edition, 1995. See, also ISO/IEC 9945-1:1990c. Pthreads implementations are available on most UNIX systems today.

Most of the early work on thread scheduling concentrates on load balancing, where threads are placed in a FIFO-based central ready queue. Example systems include the Presto system, Brown Threads system, and loop scheduling systems. In these systems, processors take threads from this central ready queue and run them to completion. The load is evenly balanced, but this technique does not take advantage of locality and significant cache misses can occur on specific processors. Also, such schemes scale poorly.

Anderson et al. have proposed a scheme with per-processor ready queues. See, e.g., Thomas Anderson, Brian Bershad, Edward Lazowska, and Henry Levy, Thread Management for Shared-Memory Multi-processors, Technical Report, Department of Computer Science and Engineering, University of Washington, 1991; and Thomas Anderson, FastThreads User's Manual, Department of Computer Science and Engineering, University of Washington, Seattle, 1990. This improves scalability by reducing contention. It also preserves processor affinity to some extent. Under this scheme, a thread may execute on the processor on which it was created. However, a processor can steal a thread from the queue of another processor. These per-processor local queues use shared locks to permit thread stealing and so incur high context switch time.

Markatos and Leblanc did an experimental study of scheduling strategies on the SGI™ IRIS (UMA—Uniform Memory Access) and BBN™ Butterfly shared memory (NUMA—Non-Uniform Memory Access) computer systems, wherein the experiments involved combinations of thread assignment policies with thread reassignment policies. See, e.g., Evangelos Markatos and Thomas LeBlanc, Load Balancing vs. Locality Management in Shared-Memory Multi-processors, Proceedings of the International Conference on Parallel Processing, pages 258–267, August 1992. Two kinds of thread assignment policies were studied: (1) load balancing (LB), where a thread is assigned to a processor with the shortest queue, and (2) memory-conscious scheduling (MCS), where a thread is assigned to a processor whose local memory contains most of the data accessed by a thread.

These were combined with three rescheduling policies to keep the processors as busy as possible: (1) Aggressive Migration (AM), where an idle processor steals a thread from a processor with the longest queue; (2) No Migration (NM, which prefers locality to migration; and (3) Beneficial Migration (BM), where an idle processor searches the queue of other processors for a thread whose migration will lower the execution time. Note that BM is an unrealizable policy as it requires complete information about the execution times and data access patterns of the threads.

The authors conclude that central queues are inadequate even on small systems. Per-processor queues by themselves are not enough and should be combined with thread reassignment strategies. The authors recognize that locality management is an important issue as processor speeds continue to increase at a rate faster than that of memories or interconnect networks.

In Torrellas, Tucker, and Gupta, the authors study cache-affinity based scheduling policies. See, e.g., Joseph Torrellas, Andrew Tucker, and Anoop Gupta, Evaluating the Performance of Cache-Affinity Scheduling in Shared Memory Multi-processors, Journal of Parallel and Distributed Computing, 22(2):139–151, February 1995. This publication explores affinity scheduling to reduce cache misses by preferentially scheduling a process on a processor where it ran most recently. The implementation adds affinity to an existing system by raising the priorities of processes that are attractive from the standpoint of affinity scheduling when searching the ready queue.

Steckermeier and Bellosa use locality information in user program-level scheduling for cache optimization in a hierarchical shared memory (NUMA) machine, like the Convex Exemplar. See, e.g., Martin Steckermeier and Frank Bellossa, Using Locality Information in User Level Scheduling, Technical Report TR-95-14, University of Erlangenurnberg, Computer Science Department, Operating Systems-IMMD IV, Martensstraffi, 91058 Erlangen, Germany, December 1995. A thread is scheduled on a processor in whose local memory the thread has most of its data. Also, two different threads which access the same data set are scheduled on the same processor.

The COOL system provides facilities to provide affinity hints with tasks. See, e.g., Rohit Chandra, Anoop Gupta, and John Hennessy, COOL: An Object-Based Language for Parallel Programming, Computer, pages 13–26, August 1994. COOL is an parallel extension to C++ for shared-memory parallelism that provides a variety of facilities for locality and affinity, wherein functions marked as "parallel" execute as separate tasks and each processor has its own task queues. In COOL, tasks can be co-located to exploit cache affinity. Similarly, they can declared to be affine to a processor to exploit processor affinity. Tasks operating on the same data can also be declared to execute back-to-back on the same processor. However, COOL affinity specifications are used only at task creation time and there is no way to change the specification as tasks are running. Moreover, COOL tasks do not have thread capabilities.

Additional information on the prior art can be found in the inventor's own thesis. See, e.g., Neelakantan Sundaresan, Modeling Control and Dynamic Data Parallelism in Object-Oriented Languages, Ph.D thesis, Indiana University, Bloomington, September 1995.

Although these publications evidence the research undertaken in recent years, there is a need in the art for more sophisticated techniques for scheduling multi-threaded user programs, especially as multi-processor computer systems become more common. Indeed, there is a need in the art for scheduling techniques that fully exploit the sometimes competing interests of affinity, locality, and load balancing. Further, there is a need in the art that permits such characteristics to be defined and modified dynamically.

SUMMARY OF THE INVENTION

To overcome the limitations in the prior art described above, and to overcome other limitations that will become apparent upon reading and understanding the present specification, the present invention discloses a method, apparatus, and article of manufacture for dynamically exploiting affinity, locality, and load balancing in scheduling the execution of multi-threaded user programs in a multi-processor computer system. Affinity, locality, and load balancing characteristics are specified at thread creation time and can be dynamically changed during thread execution, either by the user program itself or by any other process or entity with sufficient privileges and information. A central schedule queue and one or more per-processor local schedule queues are used to schedule the threads based on the dynamically changing affinity, locality, and load balancing characteristics.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to the accompanying detailed description, in which there is illustrated and described specific examples of a method, apparatus, and article of manufacture in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention discloses a technique for dynamically changing affinity, locality, and load balancing characteristics used for processor scheduling of threads based on user program input. According to the present invention, a user program can specify thread affinity, locality, and load balancing scheduling parameters at thread creation time and can change these parameters dynamically during thread execution. In addition, other entities with sufficient information and privileges may also specify such scheduling parameters.

The preferred embodiment implements two types of schedule queues for the execution of user program threads: a central schedule queue and one or more per-processor local schedule queues, although other queue structures could be used. The preferred embodiment uses the notion that, when the user program has sufficient information on the data access patterns of threads, the scheduling and context switching of these threads through both the central schedule queue and the per-processor local schedule queues can be made to be faster than prior art systems.

The present invention provides the following facilities:

Threads can be specified to have affinity to each other, so that threads with the same affinity-ids are scheduled back-to-back in the same processor. Threads with the same affinity-ids operate on the same data and thus if one thread has already caused the data from memory to appear on the cache or the memory closest to the processor, the other thread can execute on the same processor to reuse this cached data to reduce cache misses and improve performance.

Threads can be specified to be local to a specified processor, or a set of available processors, or a subset of available processors. Threads with a locality of a specified processor are scheduled using the local schedule queue of the processor and have a low context switch time because cheaper locks are involved.

Threads with a locality of −1 can be executed on any available processor, to enhance load balancing.

The affinity and locality of threads can be dynamically changed. A thread with certain locality and affinity characteristics can have its locality and affinity characteristics changed at any point of its execution based on execution or data access patterns.

Environment

Figure 1:
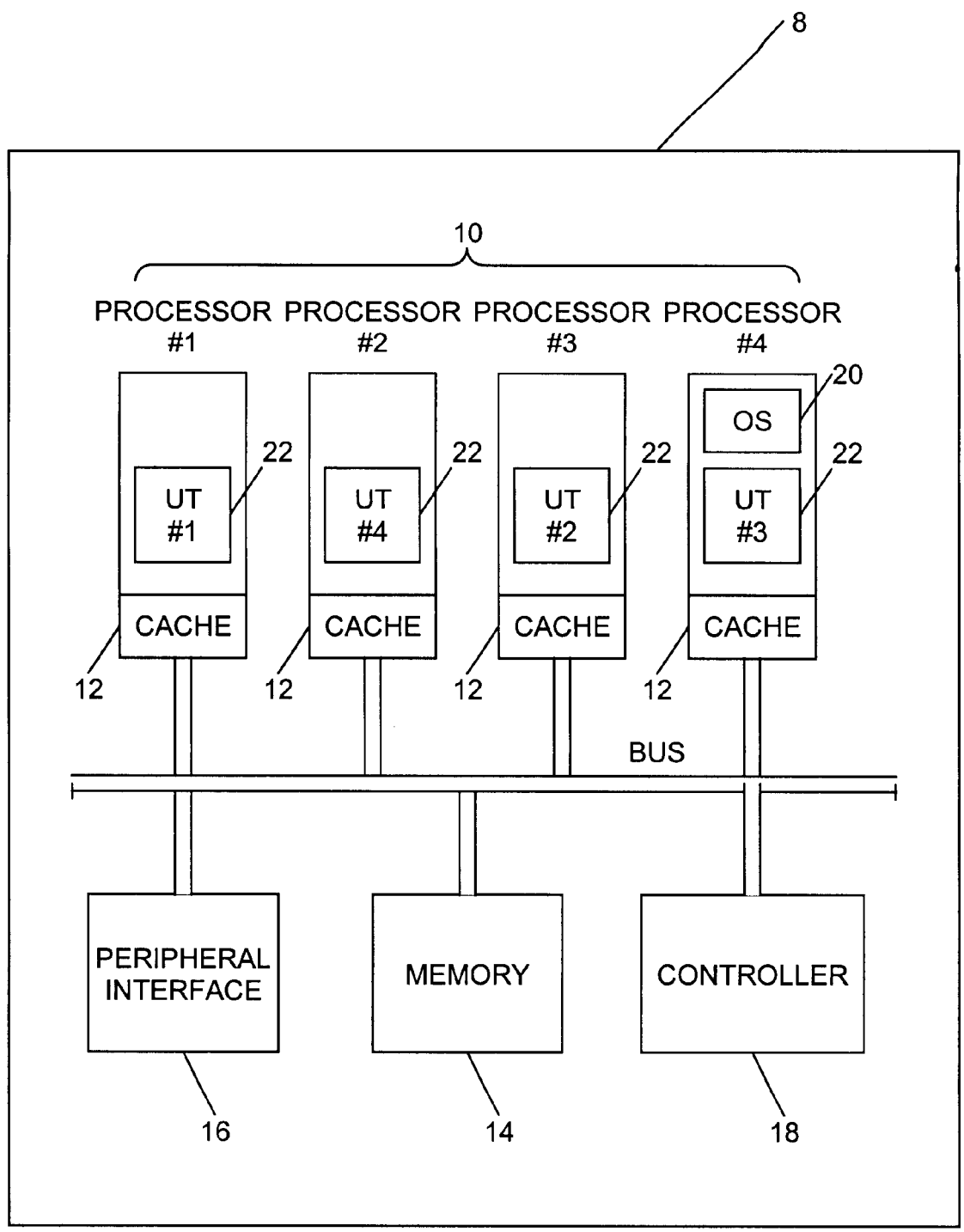
FIG. 1 is a block diagram that illustrates an exemplary hardware environment according to the preferred embodiment of the present invention.

FIG. 1 is a block diagram that illustrates an exemplary hardware environment implemented according to the preferred embodiment of the present invention. In the exemplary hardware environment, a computer system 8 is typically a symmetric multi-processor (SMP) architecture and is comprised of a plurality of processors 10 (each of which has a cache 12), shared random access memory (RAM) 14, and other components, such as peripheral interfaces 16, controllers 18, etc. The computer system 8 operates under the control of an operating system 20, which in turn controls the execution of one or more user program threads (UTs) 22 on the various processors 10. Of course, those skilled in the art will recognize that the exemplary environment illustrated in FIG. 1 is not intended to limit the present invention. Indeed, those skilled in the art will recognize that other alternative hardware environments may be used without departing from the scope of the present invention.

Figure 2:
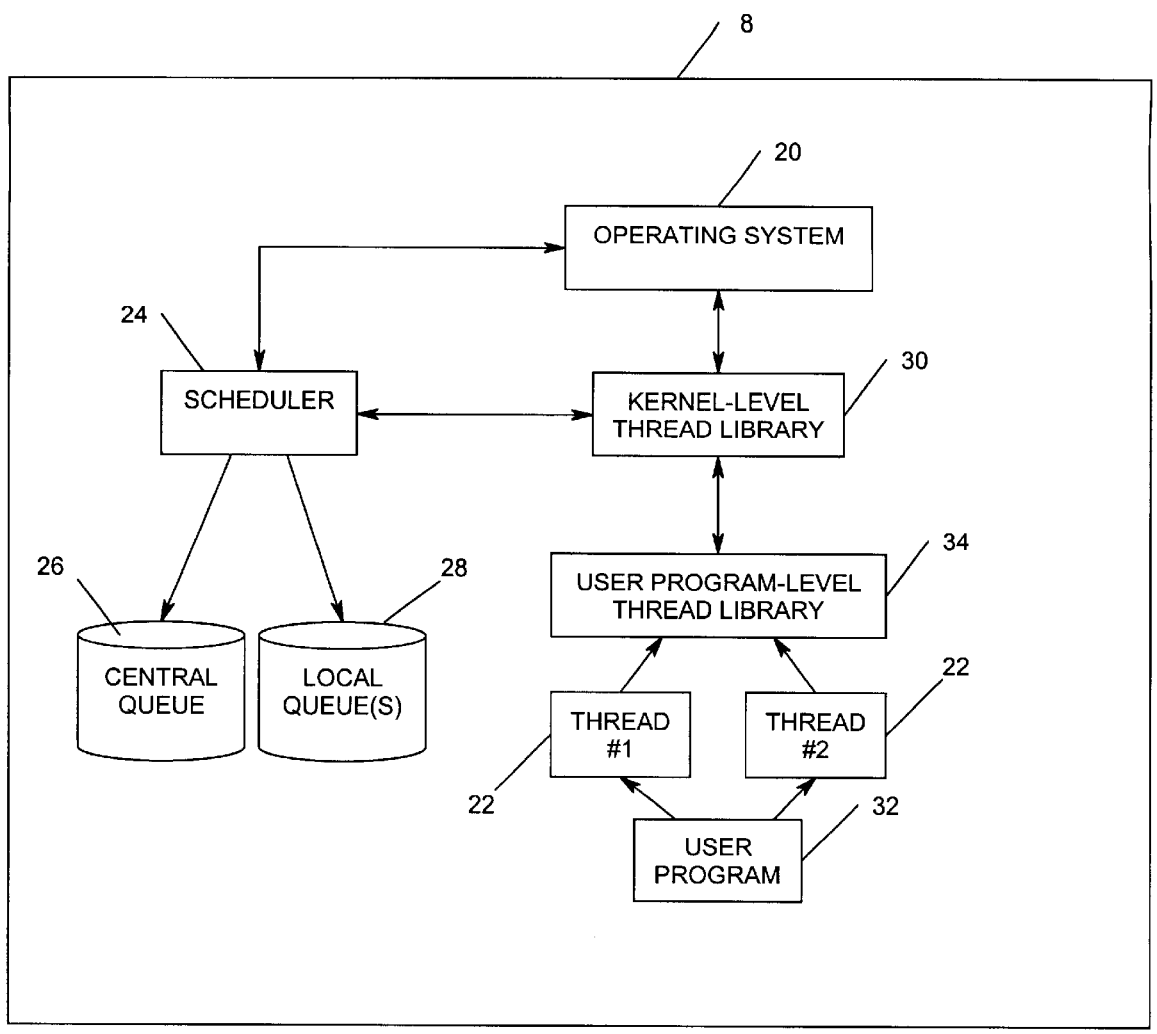
FIG. 2 is a block diagram that further illustrates the exemplary software environment according to the preferred embodiment of the present invention.

FIG. 2 is a block diagram that further illustrates the exemplary software environment implemented according to the preferred embodiment of the present invention. In the exemplary software environment, the operating system 20 includes a scheduler 24, a central schedule queue 26, one or more per-processor local scheduler queues 28, and a kernel-level thread library 30. The threads 22 result from the execution of a user program 32 in conjunction with a user program-level thread library 38 that provides support for multi-threaded operations.

Figure 3:
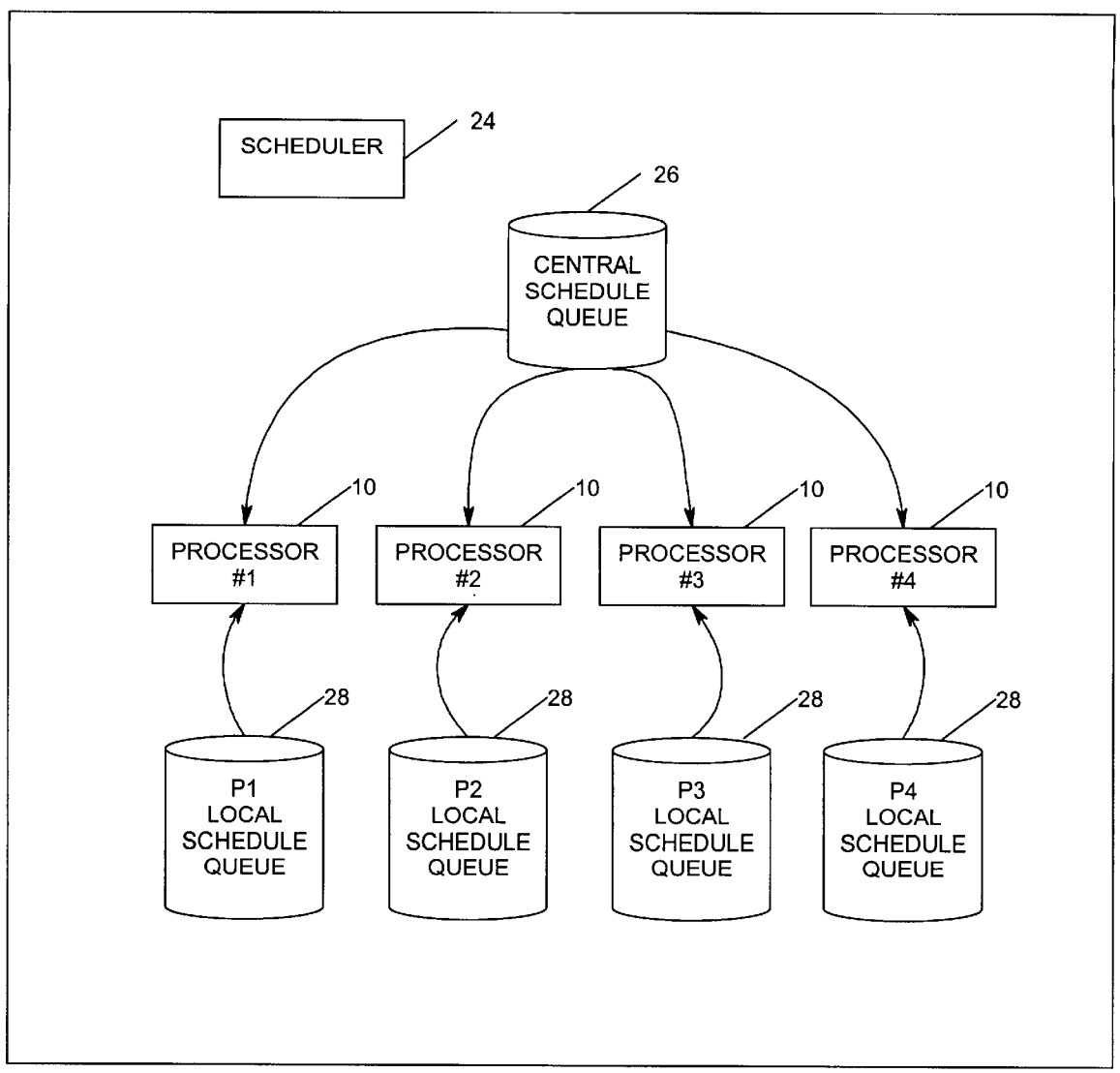
FIG. 3 is a block diagram that illustrates an exemplary central schedule queue and per-processor local schedule queues according to the preferred embodiment of the present invention.

FIG. 3 is a block diagram that illustrates an exemplary central schedule queue 26 and per-processor local schedule queues 28 implemented according to the preferred embodiment of the present invention. Threads 22 resident in the central schedule queue 26 may be scheduled for execution on any available processor 10 by the scheduler 24, while threads 22 resident in the per-processor local schedule queues 28 may be scheduled for execution only on the specified processor 10 (when available) by the scheduler 24.

Those skilled in the art, however, will recognize that alternative embodiments could use different types and numbers of queues, e.g., a hierarchical set of queues, where each queue corresponds to a subset of the set of all processors and which define the migration domain of the threads belonging to the queue, without departing from the scope of the present invention.

Figure 4:
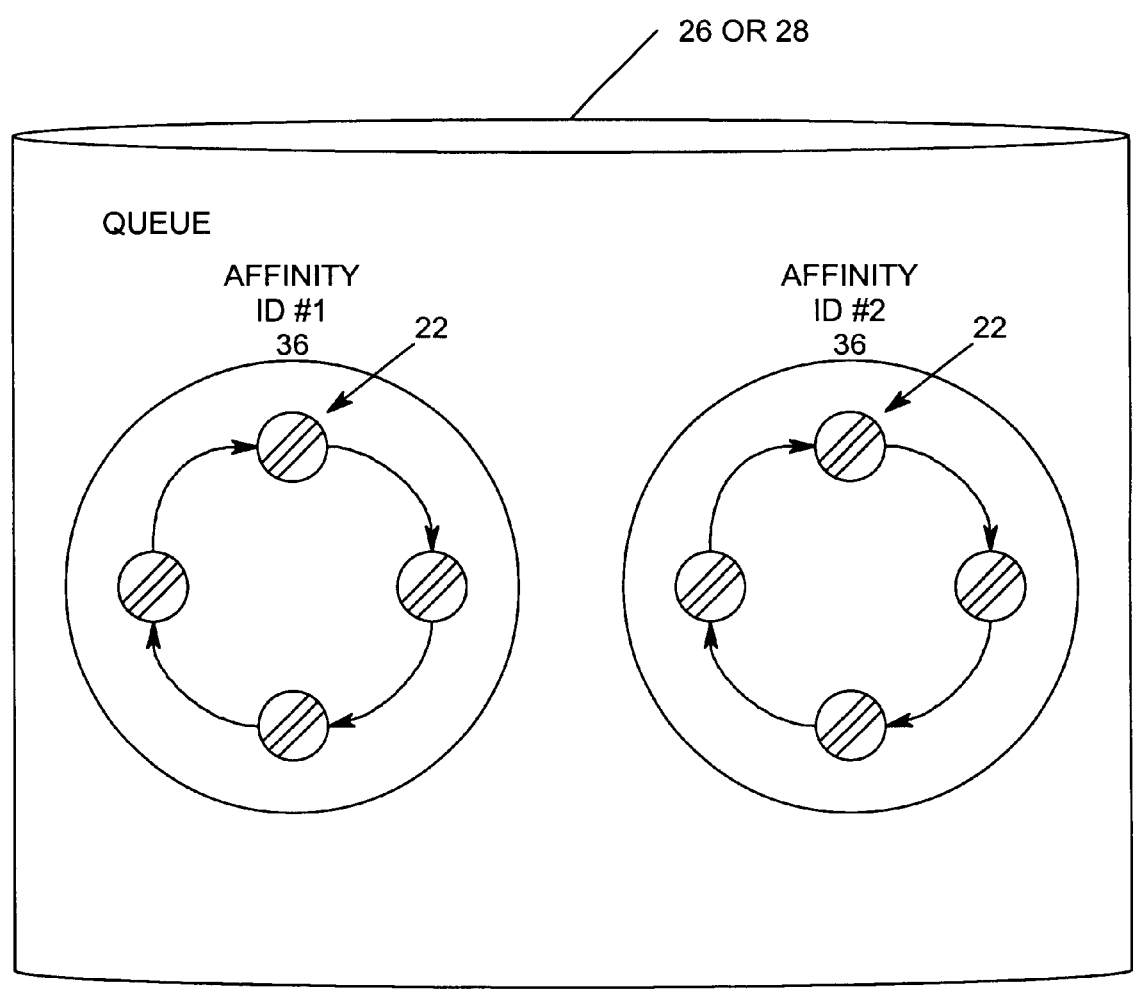
FIG. 4 is a block diagram that illustrates the grouping of threads by affinity-ids in a schedule queue according to the preferred embodiment of the present invention.

FIG. 4 is a block diagram that illustrates the grouping of threads 22 by affinity-ids 36 in a schedule queue 26 or 28. In the exemplary structure, threads 22 with the same affinity-ids 36 are scheduled for execution back-to-back in the same processor 10, so that they can operate on the same data.

The operating system 20, threads 22, scheduler 24, scheduler queues 26 and 28, kernel-level thread library 30, user program 32, and user-program-level thread library 34 are each comprised of instructions, data structures, and/or data which, when read, interpreted, and/or executed by the processors 10, causes the processors 10 to perform the steps necessary to implement and/or use the preferred embodiment of the present invention, as described in more detail below. Generally, the operating system 20, threads 22, scheduler 24, scheduler queues 26 and 28, kernel-level thread library 30, user program 32, and user-program-level thread library 34 are embodied in and/or readable from a device, carrier, or media, such as memory, data storage devices, and/or remote devices connected to the computer system 8 via one or more data communications devices.

Thus, the present invention may be implemented as a method, apparatus, or article of manufacture using standard programming and/or engineering techniques to produce software, firmware, hardware, or any combination thereof. The term "article of manufacture" (or alternatively, "carrier or product") as used herein is intended to encompass logic, data structures, and/or data accessible from any device, carrier, or media. Of course, those skilled in the art will recognize many modifications may be made to this configuration without departing from the scope of the present invention.

Those skilled in the art will recognize that the exemplary environments and structures illustrated in FIGS. 1, 2, 3, and 4 are not intended to limit the present invention. Indeed, those skilled in the art will recognize that other alternative environments and structures may be used without departing from the scope of the present invention.

Functions of the User Program-Level Thread Library

The user program-level thread library 34 provides a number of different functions that permit threads 22 to be created and deleted in large numbers during the lifetime of a user program 32. When a user program 32 requests the creation of a thread 22 through the user program-level library 34, it specifies the function that this thread 22 executes, the argument to be passed to this function, the stack information for the thread 22, and any other optimization arguments related to affinity, locality, and load-balancing.

The stack information and the optimization arguments are optional and the library 34 assumes a default value if not specified. For example, the user program 32 may provide its own stack pointer, or specify that the thread 22 uses a stack of some specific size, or relegate the decision to the library 34. Creating a thread 22 involves allocating a stack for the thread 22, initializing its context data-structures, and adding the thread 22 to the appropriate scheduling queue 26 or 28.

The thread 22 remains in the schedule queue 26 or 28 until it is dispatched for execution by the scheduler 24.

Each thread 22 executes a function MAIN_FUNCTION (INT ARGC, CHAR ARGV) in the user-program-level thread library 34, which is a user program-specified function. This function specifies the main procedure of the thread 22 in the parallel environment the same way as the C function MAIN(INT ARGC, CHAR ARGV) specifies the main procedure in a sequential environment.

A function NUM_PROCESSOR() in the library 34 returns the number of processors 10 available in the system 8.

The thread 22 can identify the processor 10 on which it is executing by invoking the function THIS_PROCESSOR() in the library 34. This function returns a value from 0 to NUM_PROCESSORS()-1. In one embodiment, the number of processors 10 that may used by the thread 22 is specified at invocation time, but alternative embodiments may make it dynamic, i.e., so that processors 10 can be added and deleted dynamically.

Context switching between threads 22 can occur when a thread 22 yields, or blocks, or exits. When a thread 22 yields by invoking the function THREAD_YIELD() in the library 34, it gets pushed into a schedule queue 26 or 28 and it switches context with another thread 22 from the schedule queue 26 or 28.

When a thread 22 blocks by invoking the function THREAD_BLOCK() in the library 34, it switches context with another thread 22 from the schedule queue 26 or 28.

The thread 22 is unblocked by another thread 22 that invokes the function THREAD_UNBLOCK(THREAD T*T) in the library 34, which requires a pointer of type THREAD T*. This causes the thread 22 to be added to the schedule queue 26 or 28. The difference between a blocked thread 22 and a yielding thread 22 is that a blocked thread 22 gives up the processor 10, but does not go back to the schedule queue 26 or 28 and has to be explicitly unblocked to be put back into the schedule queue 26 or 28, while a yielding thread 22 is automatically re-scheduled when it relinquishes the processor 10.

A thread 22 exits or terminates by calling the function THREAD_EXIT(VOID* RET_VAL) in the library 34, wherein the variable RET_VAL is the value returned by the thread 22. When the thread 22 exits or terminates, the scheduler 24 switches its context with another thread 22 from the schedule queue 26 or 28.

A thread 22 can wait for another thread 22 to finish executing by calling the function THREAD_JOINT (THREAD T*T, VOID**RET_VAL P) in the library 34. The allocated resources for the thread 22 are cleaned up after it has terminated and after another thread 22 has joined it. For sake of correctness and efficiency, the user program-level thread library 34 allows a thread 22 TA to "join" TA only if TA is the creator of TB.

A thread 22 can identify itself by invoking the function THIS_THREAD() in the library 34, which returns a pointer of type THREAD T*.

The total number of threads 22 on the system 8 at any point of time can be obtained by calling the function NUM_THREADS() in the library 34. Threads 22 are also identified by logical numbers from 0 to NUM_THREADS() The function THREAD_ID(THREAD T*) in the library 34 returns a pointer to a thread 22 and the function THIS_THREAD ID() returns the pointer corresponding to the invoking thread 22. The thread 22 pointer is useful in thread-specific output information, such as performance analysis and visualization.

The thread 22 itself can change its own migration domain using the function THREAD_MIGRATE(UNSIGNED LONG DOMAIN BITS) in the library 34. If the thread 22 can execute on a processor 10 whose logical index is P, then the Pth bit from the right in the domain bits is set to 1. However, when a thread 22 is holding a mutex it is not permitted to migrate to another processor 10 until it releases the mutex.

Locality and Load Balancing

In the preferred embodiment of the present invention, a thread 22 can be: (a) non-sticky (schedulable on any of the available processors 10); (b) part-sticky (schedulable on a set or subset of the available processors 10); or (c) sticky (schedulable only on a specified processor 10 and not migratable at all). The stickiness of a thread 22 can be changed dynamically by the thread 22 itself, or any other process or entity with sufficient rights and information, using the user program-level thread library 34 to alter the locality and load balancing characteristics of the thread 22.

Non-sticky and part-sticky threads 22 are scheduled using the central schedule queue 26, which ensures load balancing. The use of the central schedule queue 26 implies that a thread 22 that can migrate among processors 10.

However, non-sticky and part-sticky threads 22 are more expensive to schedule and context-switch than sticky threads 22 that are scheduled using the per-processor local schedule queues 28. The reason is that the data structures used to manage the central schedule queue 26 involve shared memory locks to avoid race conditions in a multi-processing context.

In contrast, the per-processor local schedule queues 28 do not need any locks to update their data structures. Thus, sticky threads 22 have a lower context-switch time than migratable threads 22.

A thread 22 that has sufficient knowledge about its execution or data access patterns can control its migration. On the other hand, by making a thread 22 sticky, better cache utilization can be achieved. Also, if the user program 32 does not have an inherent load imbalance, significant advantages can be achieved by distributing the threads 22 so that each executes on a specific processor 10.

Thread Affinity

The concept of locality can be extended to the use of affinity-ids 36 for threads 22. One or more threads 22 can have a specified affinity-id 36, so that threads 22 with the specified affinity-id 36 are executed back-to-back in a processor 10. Appropriate scheduling is done by clustering the threads 22 with the same affinity-id 36 together in a per-processor local schedule queue 28. Thus, when a thread 22 blocks, the next thread 22 to be executed is a thread 22 with the same affinity-id 36. If there is no such thread 22, then another thread 22 with a different affinity-id 36 is executed. If there is no eligible thread 22 in the per-processor local schedule queue 28, then a thread 22 from the central schedule queue 26 is dispatched for execution. When a thread 22 yields, it goes back into its cluster of threads 22 with the same affinity-id 36 on the appropriate per-processor local schedule queue 28.

State Diagram of a Thread

Figure 5:
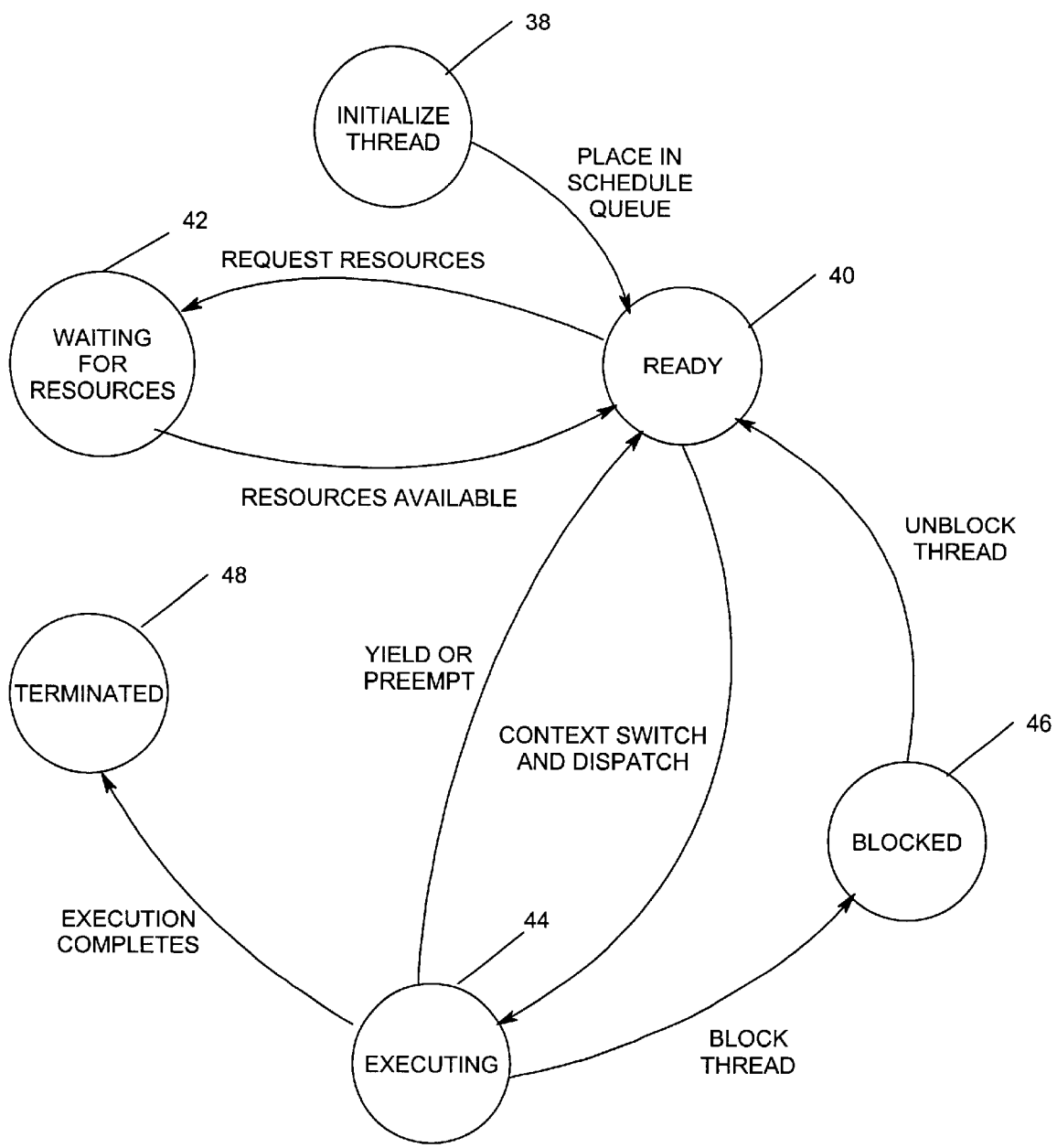
FIG. 5 is a state diagram that illustrates the different states of a thread in the computer system according to the preferred embodiment of the present invention.

FIG. 5 is a state diagram that illustrates the different states of a thread 22 in the computer system 8 according to the preferred embodiment of the present invention. Of course, those skilled in the art will recognize that other logic could be used without departing from the scope of the present invention.

A thread 22 is first initialized at state 38, where it may specify its affinity, locality, and load balancing characteristics. From state 38, a transition is made to state 40, where the scheduler 24 places the thread 22 in a schedule queue 26 or 28, according to its affinity, locality, and load balancing characteristics. From state 40, threads 22 may transition to state 42 to wait for resources or state 44 to execute. From state 42, the thread transitions back to state 40. From state 44, the thread 22 transitions back to state 40 when it yields or is preempted, to state 46 when it is blocked, or to state 48 when it exits or terminates. During these state transitions, the thread 22 may alter its affinity, locality, or load balancing characteristics to effect the operation of the scheduler 24 at state 40.

Logic of the Scheduler

Figure 6:
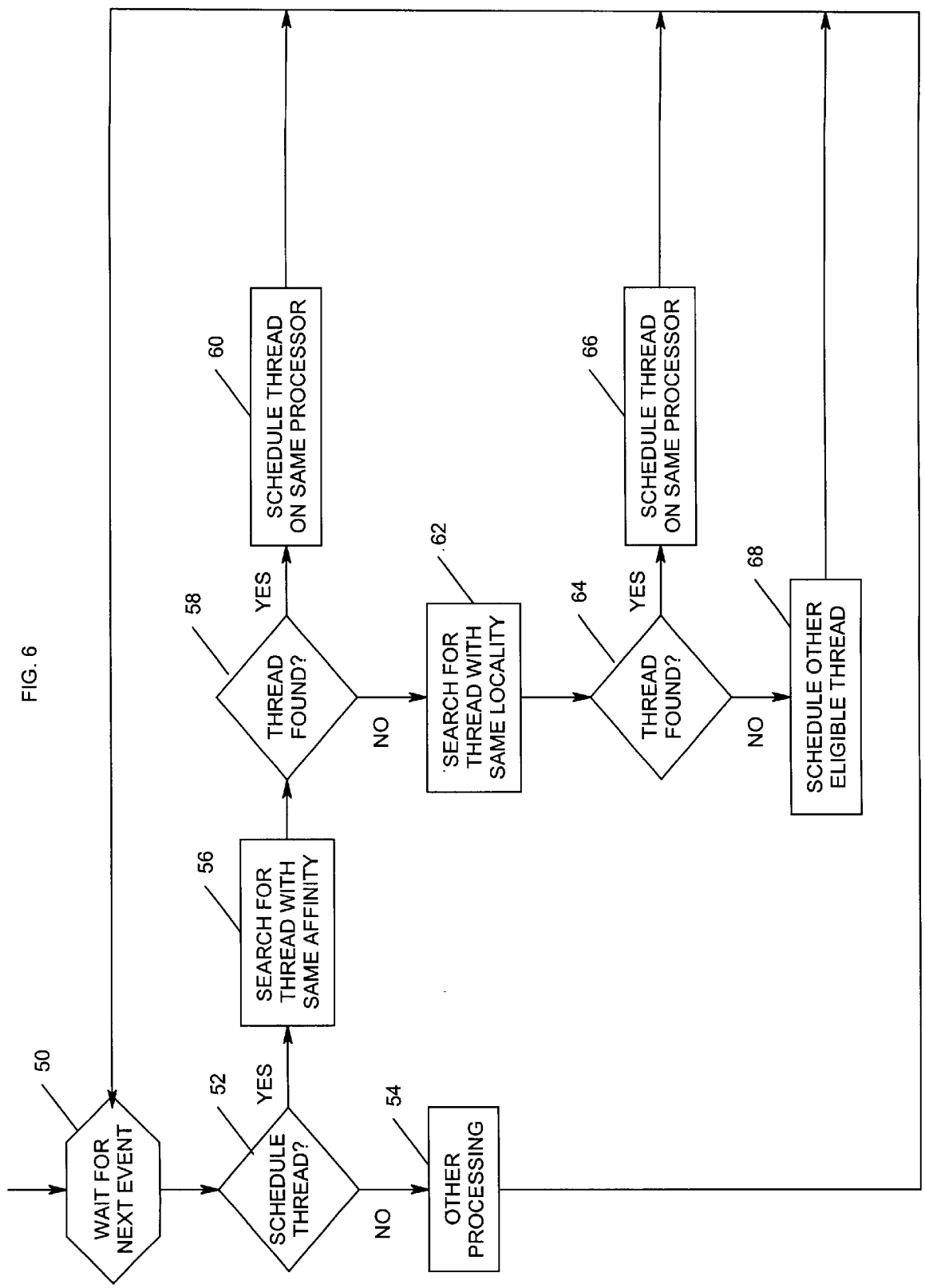
FIG. 6 is a flowchart that illustrates exemplary logic performed by the scheduler during the ready state illustrated in FIG. 5 according to the preferred embodiment of the present invention.

FIG. 6 is a flowchart that illustrates exemplary logic performed by the scheduler 24 during the ready state 40 according to the preferred embodiment of the present invention. Of course, those skilled in the art will recognize that other logic could be used without departing from the scope of the present invention.

Block 50 represents the scheduler 24 waiting for the next event occur. When an event does occur, such as an I/O event, etc., the logic of Blocks 52–68 is performed Block 52 is a decision block that represents the scheduler 24 determining whether the event was a notification that a thread 22 requires scheduling (e.g., another thread 22 is being de-scheduled). If not, control transfers to Block 54, which represents the scheduler 24 performing other processing and then to Block 50; otherwise, control transfers to Block 56.

Block 56 represents the scheduler 24 searching for a group of threads 22 in one of the schedule queues 26 or 28 having with the same affinity-id 36 as that specified for the thread 22 being de-scheduled.

Block 58 is a decision block that represents the scheduler 24 determining whether a thread 22 with the same affinity-id 36 was found. If so, control transfers to Block 60; otherwise, control transfers to Block 62.

Block 60 represents the scheduler 24 scheduling the thread 22 with the same affinity-id 36 for execution on the processor 10. Thereafter, control transfers back to Block 50.

Block 62 represents the scheduler 24 searching for a thread 22 in one of the schedule queues 26 or 28 having with the same locality as that specified for the thread 22 being de-scheduled.

Block 64 is a decision block that represents the scheduler 24 determining whether a thread 22 with the same local was found. If so, control transfers to Block 66; otherwise, control transfers to Block 68.

Block 66 represents the scheduler 24 scheduling the thread 22 with the same locality for execution on the processor 10. Thereafter, control transfers back to Block 50.

Block 68 represents the scheduler 24 scheduling some other eligible thread 22 from the central queue 26 for execution on the processor 10. Thereafter, control transfers back to Block 50.

Conclusion

This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely) to the technique of multi-threading could benefit from the present invention.

In summary, the present invention discloses a method, apparatus, and computer program carrier for dynamically exploiting affinity, locality, and load balancing for scheduling execution of multi-threaded user programs in a multiprocessor computer system. Affinity, locality, and load balancing characteristics are specified at thread creation time and can be dynamically changed during thread execution, either by the user program itself or by any other process or entity with sufficient privileges and information. A central schedule queue and one or more per-processor local schedule queues are used to schedule the threads based on the affinity, locality, and load balancing characteristics.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of scheduling thread execution in a computer, comprising the steps of:
    (a) creating a thread in a memory of a computer,
    (b) specifying one or more scheduling characteristics of the thread;
    (c) scheduling execution of the thread in the computer in accordance with the specified scheduling characteristics; and
    (d) modifying one or more of the scheduling characteristics of the thread during the execution of the thread.

2. The method of claim 1, wherein the specified scheduling characteristics are selected from a group comprising a locality characteristic, an affinity characteristic, and a load balancing characteristic.

3. The method of claim 2, wherein the locality characteristic indicates that the thread is executed by a specified processor.

4. The method of claim 3, further comprising the step of scheduling the thread for execution using a local schedule queue of the specified processor.

5. The method of claim 2, wherein the locality characteristic indicates that the thread is local to a subset of available processors.

6. The method of claim 2, wherein the locality characteristic indicates that the thread can execute on any processor.

7. The method of claim 2, wherein the affinity characteristic indicates that the thread can reuse data from a prior thread.

8. The method of claim 2, wherein the affinity characteristic indicates that the thread is affine to another thread.

9. The method of claim 8, further comprising the step of scheduling the affine threads for execution back-to-back in a processor when the affine threads have a same locality characteristic.

10. The method of claim 8, wherein the affine threads operate on shared data.

11. Method of claim 8, further comprising the step of scheduling a second thread for execution in a processor after a first thread has completed its execution, when the first and second threads are affine threads, so that the second thread can reuse cached data in the processor.

12. The method of claim 1, wherein the specifying step comprises the step of specifying one or more of the specified scheduling characteristics of the thread during execution of the thread.

13. The method of claim 12, wherein the scheduling characteristics are specified b the thread itself.

14. The method of claim 1, wherein the specifying step comprises the step of specifying one or more of the scheduling characteristics of the thread when the thread is created.

15. The method of claim 14, wherein the scheduling characteristics are specified by the thread itself.

16. The method of claim 1, wherein the scheduling characteristics are modified by the thread itself.

17. The method of claim 1, wherein the scheduling characteristics are modified b an entity other than the thread.

18. The method of claim 1, wherein the modifying step comprises the step of dynamically modifying one or more of the scheduling characteristics of the thread during execution of the thread based on an operation of the thread.

19. The method of claim 1, wherein the modifying step comprises the step of dynamically modifying one or more of the scheduling characteristics of the thread during execution of the thread based on a data access pattern of the thread.

20. The method of claim 1, wherein the specifying step comprises the step of specifying one or more scheduling characteristics of the thread via a user-level thread library.

21. The method of claim 20, wherein the user-level thread library provides facilities to specify the affinity, locality, and load balancing characteristics used in scheduling the thread for execution.

22. The method of claim 1, wherein the scheduling step comprises the step of scheduling execution of the thread in the computer in accordance with the specified scheduling characteristics using a central schedule queue and a per-processor local schedule queue.

23. The method of claim 1, wherein the thread is non-sticky and thus is schedulable on any available processor.

24. The method of claim 1, wherein the thread is part-sticky and thus is schedulable on a set or subset of available processors.

25. The method of claim 1, wherein the thread is sticky and thus is executed only on a specified processor.

26. A multi-threaded computer system, comprising:
   (a) one or more processors;
   (b) means, performed by one of the processors, for creating a thread in a memory of the computer system;
   (c) means, performed by one of the processors, for specifying one or more scheduling characteristics of the thread;
   (d) means, performed by one of the processors, for scheduling execution of the thread in the computer in accordance with the specified scheduling characteristics; and
   (e) means, performed by one of the processors, for modifying one or more of the scheduling characteristics of the thread during the execution of the thread.

27. The system of claim 26, wherein the specified scheduling characteristics are selected from a group comprising a locality characteristic, an affinity characteristic, and a load balancing characteristic.

28. The system of claim 27, wherein the locality characteristic indicates that the thread is executed by a specified processor.

29. The system of claim 28, further comprising means for scheduling the thread for execution using a local schedule queue of the specified processor.

30. The system of claim 27, wherein the locality characteristic indicates that the thread is local to a subset of available processors.

31. The system of claim 27, wherein the locality characteristic indicates that the thread is can execute on any processor.

32. The system of claim 27, wherein the affinity characteristic indicates that the thread can reuse data from a prior thread.

33. The system of claim 27, wherein the affinity characteristic indicates that the thread is affine to another thread.

34. The system of claim 33, further comprising means for scheduling the affine threads for execution back-to-back in a processor when the affine threads have a same locality characteristic.

35. The system of claim 33, wherein the affine threads operate on shared data.

36. The system of claim 33, further comprising means for scheduling a second thread for execution in a processor after a first thread has completed its execution, when the first and second threads are affine threads, so that the second thread can reuse cached data in the processor.

37. The system of claim 26, wherein the means for specifying comprises means for specifying one or more of the specified scheduling characteristics of the thread during execution of the thread.

38. The system of claim 37, wherein the scheduling characteristics are specified by the thread itself.

39. The system of claim 26, wherein the means for specifying comprises means for specifying one or more of the scheduling characteristics of the thread when the thread is created.

40. The system of claim 39, wherein the scheduling characteristics are specified by the thread itself.

41. The system of claim 26, wherein the scheduling characteristics are modified by the thread itself.

42. The system of claim 26, wherein the scheduling characteristics are modified by an entity other than the thread.

43. The system of claim 26, wherein the means for modifying comprises means for dynamically modifying one or more of the scheduling characteristics of the thread during execution of the thread based on an operation of the thread.

44. The system of claim 26, wherein the means for modifying comprises means for dynamically modifying one or more of the scheduling characteristics of the thread during execution of the thread based on a data access pattern of the thread.

45. The system of claim 26, wherein the means for specifying comprises means for specifying one or more scheduling characteristics of the thread via a user-level thread library.

46. The system of claim 45, wherein the user-level thread library provides facilities to specify the affinity, locality, and load balancing characteristics used in scheduling the thread for execution.

47. The system of claim 26, wherein the means for scheduling comprises means for scheduling execution of the thread in the computer in accordance with the specified scheduling characteristics using a central schedule queue and a per-processor local schedule queue.

48. The system of claim 26, wherein the thread is non-sticky and thus is schedulable on any available processor.

49. The system of claim 26, wherein the thread is part-sticky and thus is schedulable on a set or subset of available processors.

50. The system of claim 26, wherein the thread is sticky and thus is executed only on a specified processor.

51. A carrier embodying logic for scheduling thread execution in one or more processors, the logic comprising the steps of:

(a) creating a thread in a memory of the processor;

(b) specifying one or more scheduling characteristics of the thread;

(c) scheduling execution of the thread in one or more of the processors in accordance with the specified scheduling characteristics; and (d) modifying one or more of the scheduling characteristics of the thread during the execution of the thread.

52. The method of claim 51, wherein the specified scheduling characteristics are selected from a group comprising a locality characteristic, an affinity characteristic, and a load balancing characteristic.

53. The method of claim 52, wherein the locality characteristic indicates that the thread is executed by a specified processor.

54. The method of claim 53, further comprising the step of scheduling the thread for execution using a local schedule queue of the specified processor.

55. The method of claim 52, wherein the locality characteristic indicates that the thread is local to a subset of available processors.

56. The method of claim 52, wherein the locality characteristic indicates that the thread is can execute on any processor.

57. The method of claim 52, wherein the affinity characteristic indicates that the thread can reuse data from a prior thread.

58. The method of claim 52, wherein the affinity characteristic indicates that the thread is affine to another thread.

59. The method of claim 58, further comprising the step of scheduling the affine threads for execution back-to-back in a processor when the affine threads have a same locality characteristic.

60. The method of claim 58, wherein the affine threads operate on shared data.

61. The method of claim 58, further comprising the step of scheduling a second thread for execution in a processor after a first thread has completed its execution, when the first and second threads are affine threads, so that the second thread can reuse cached data in the processor.

62. The method of claim 51, wherein the specifying step comprises the step of specifying one or more of the specified scheduling characteristics of the thread during execution of the thread.

63. The method of claim 62, wherein the scheduling characteristics are specified by the thread itself.

64. The method of claim 51, wherein the specifying step comprises the step of specifying one or more of the scheduling characteristics of the thread when the thread is created.

65. The method of claim 64, wherein the scheduling characteristics are specified by the thread itself.

66. The method of claim 51, wherein the scheduling characteristics are modified by the thread itself.

67. The method of claim 51, wherein the scheduling characteristics are modified by an entity other than the thread.

68. The method of claim 51, wherein the modifying step comprises the step of dynamically modifying one or more of the scheduling characteristics of the thread during execution of the thread based on an operation of the thread.

69. The method of claim 51, wherein the modifying step comprises the step of dynamically modifying one or more of the scheduling characteristics of the thread during execution of the thread based on a data access pattern of the thread.

70. The method of claim 51, wherein the specifying step comprises the step of specifying one or more scheduling characteristics of the thread via a user-level thread library.

71. The method of claim 70, wherein the user-level thread library provides facilities to specify the affinity, locality, and load balancing characteristics used in scheduling the thread for execution.

72. The method of claim 51, wherein the scheduling step comprises the step of scheduling execution of the thread in the computer in accordance with the specified scheduling characteristics using a central schedule queue and a per-processor local schedule queue.

73. The method of claim 51, wherein the thread is non-sticky and thus is schedulable on any available processor.

74. The method of claim 51, wherein the thread is part-sticky and thus is schedulable on a set or subset of available processors.

75. The method of claim 51, wherein the thread is sticky and thus is executed only on a specified processor.

* * * * *